(12) United States Patent
BenSaleh et al.

(10) Patent No.: US 10,496,596 B2
(45) Date of Patent: Dec. 3, 2019

(54) APPLICATION SPECIFIC INSTRUCTION-SET PROCESSOR (ASIP) ARCHITECTURE HAVING SEPARATED INPUT AND OUTPUT DATA PORTS

(71) Applicant: The King Abdulaziz City for Science and Technology, Riyadh (SA)

(72) Inventors: Mohammed S BenSaleh, Riyadh (SA); Abdulfattah M Obeid, Riyadh (SA); Yousef A Alzahrani, Riyadh (SA); Ahmed F Shalash, Cairo (EG); Hossam A Fahmy, Cairo (EG); Hossam A Sayed, Cairo (EG); Mohamed A Aly, Cairo (EG)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 342 days.

(21) Appl. No.: 15/431,394

(22) Filed: Feb. 13, 2017

(65) Prior Publication Data

US 2018/0232337 A1 Aug. 16, 2018

(51) Int. Cl.
*G06F 15/78* (2006.01)
*G06F 13/00* (2006.01)
*G06F 9/30* (2018.01)

(52) U.S. Cl.
CPC .................................. *G06F 15/78* (2013.01)

(58) Field of Classification Search
None
See application file for complete search history.

(56) References Cited

U.S. PATENT DOCUMENTS

| | | | | |
|---|---|---|---|---|
| 6,385,757 B1* | 5/2002 | Gupta | ................. | G06F 17/5045 |
| | | | | 716/102 |
| 7,577,820 B1* | 8/2009 | Wentzlaff | ................ | G06F 15/16 |
| | | | | 712/10 |
| 7,882,307 B1* | 2/2011 | Wentzlaff | ............ | G06F 12/0813 |
| | | | | 711/119 |
| 7,941,635 B2* | 5/2011 | Nguyen | .............. | G06F 9/30101 |
| | | | | 712/23 |
| 8,006,204 B2* | 8/2011 | Killian | ................ | G06F 17/5045 |
| | | | | 700/1 |
| 8,327,187 B1* | 12/2012 | Metcalf | ................. | G06F 9/5022 |
| | | | | 714/10 |

(Continued)

*Primary Examiner* — Michael Sun
(74) *Attorney, Agent, or Firm* — Steven M. Shape; Dennemeyer & Associates, LLC

(57) ABSTRACT

The invention provide an application specific instruction-set processor (ASIP) that uses a Very Long Instruction Word (VLIW) for executing atomic application specific instructions. The ASIP includes one or more units for executing a first set of atomic application specific instructions for receiving a first set of data across a plurality of input data ports in a first operation specified in an instruction word. Further, the one or more units execute a second set of atomic application specific instructions for outputting a second set of data across a plurality of output data ports in a second operation specified in the instruction word, wherein an input data port of the plurality of input data ports and a corresponding output data port of the plurality of output data ports share a same address location and are specified as operands in the instruction word. Thus, the first operation and the second operation can occur simultaneously.

12 Claims, 5 Drawing Sheets

(56) References Cited

U.S. PATENT DOCUMENTS

| | | | | |
|---|---|---|---|---|
| 8,738,860 B1* | 5/2014 | Griffin | ............... | G06F 12/0897 |
| | | | | 711/122 |
| 2009/0070568 A1* | 3/2009 | Shi | ..................... | G06F 9/30003 |
| | | | | 712/237 |
| 2014/0351563 A1* | 11/2014 | Vorbach | ................ | G06F 9/3885 |
| | | | | 712/221 |
| 2017/0286113 A1* | 10/2017 | Shanbhogue | ....... | G06F 9/30036 |
| 2018/0285112 A1* | 10/2018 | Mekkat | .............. | G06F 9/30087 |

\* cited by examiner

| Bits | 31:28 | 27 | 26 | 25 | 24 | 23:20 | 19:16 | 15:12 | 11:8 | 7:4 | 3:0 |
|------|-------|----|----|----|----|-------|-------|-------|------|-----|-----|
| dp | 1111 | 1 | mv0 | mv1 | mv2 | src0 | dst0 | src1 | dst1 | src2 | dst2 |

FIG. 2

| Value | location | definition |
|---|---|---|
| 0000 | port 0 | Input/output port 0 |
| 0001 | port 1 | Input/output port 1 |
| 0010 | port 2 | Input/output port 2 |
| 0011 | port 3 | Input/output port 3 |
| 0100 | port 4 | Input port 4 |
| 0101 | port 5 | Input port 5 |
| 0110 | stackptr | Stack pointer register |
| 0111 | frmptr | Frame pointer register |
| 1000 | g0 | General register 0 |
| 1001 | g1 | General register 1 |
| 1010 | g2 | General register 2 |
| 1011 | g3 | General register 3 |
| 1100 | g4 | General register 4 |
| 1101 | g5 | General register 5 |
| 1110 | g6 | General register 6 |
| 1111 | g7 | General register 7 |

FIG. 3

APPLICATION SPECIFIC INSTRUCTION-SET PROCESSOR (ASIP) ARCHITECTURE HAVING SEPARATED INPUT AND OUTPUT DATA PORTS

FIELD OF THE INVENTION

The invention generally relates to instruction sets for processors. Specifically, the invention relates to an application specific instruction-set processor (ASIP) having instructions for receiving a set of data across a plurality of input ports and outputting a set of data across a plurality of output ports, wherein the plurality of input data ports and the plurality of output data ports are on separate bus lines.

BACKGROUND OF THE INVENTION

Traditional processors mostly have the same data port for both input and output. Thus, the read/write enable allows the processor data port to either only have the data to output or the data to input as the input and output data ports are multiplexed on the same bus lines. This results in lower performance and lower throughput in the processors.

Thus, came into existence processors which have separated input and output data ports in order to increase the performance and throughput of the processors. The input and output data ports mostly have a separated address value for mapping the input and output data ports. This results in a large number of bits used for the address mapping, thus, making the instruction code word to be longer as different bits are used for indicating the location address for both the input data ports and the output data ports.

Therefore, in light of the above, there is a need for an improved ASIP architecture for input data ports and output data ports that are on separate bus lines.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

FIG. 2 illustrates a table that indicates data-path instructions (dps) in the ASIP for a 32-bit instruction word in accordance with an embodiment of the invention.

FIG. 3 illustrates a table that describes address locations allocated for general registers, input data ports and output data ports of the ASIP in accordance with an embodiment of the invention.

DETAILED DESCRIPTION OF THE INVENTION

Figure 1:
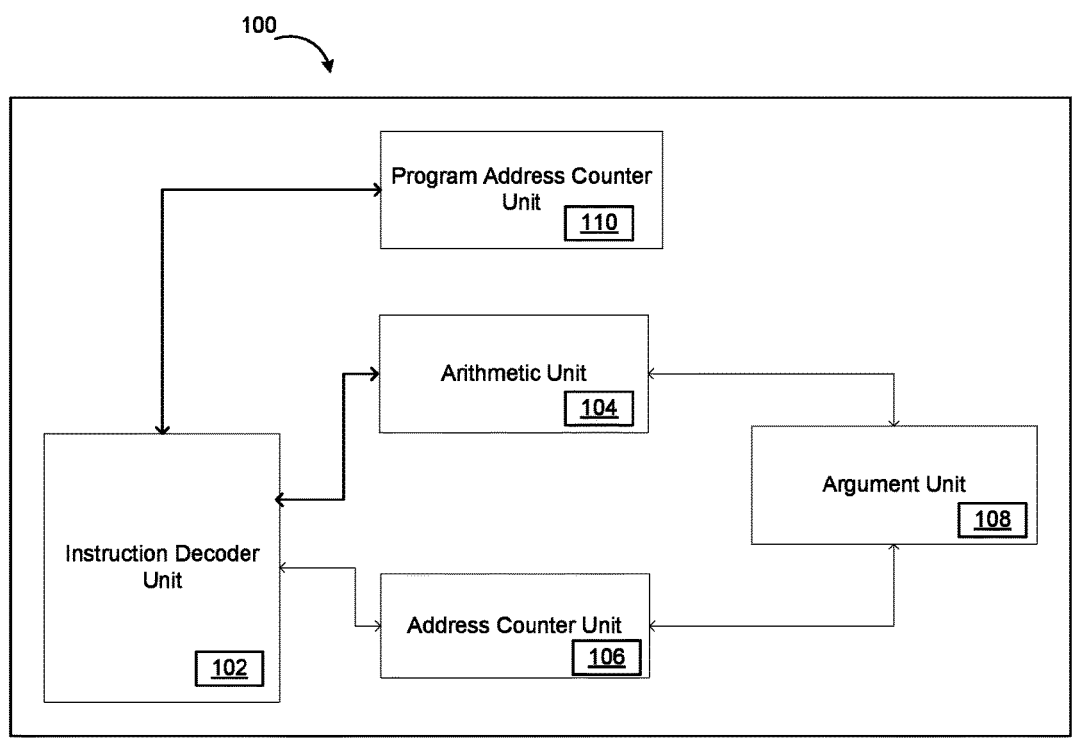
FIG. 1 illustrates an application specific instruction-set processor (ASIP) that uses a Very Long Instruction Word (VLIW) for executing atomic application specific instructions in accordance with an embodiment of the invention.

Before describing in detail embodiments that are in accordance with the invention, it should be observed that the embodiments reside primarily in combinations of method steps and system components related to an application specific instruction-set processor (ASIP) having instructions for receiving a set of data across a plurality of input ports and outputting a set of data across a plurality of output ports, wherein the plurality of input data ports and the plurality of output data ports are on separate bus lines and have the same address mapping.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide an ASIP that uses a Very Long Instruction Word (VLIW) for executing atomic application specific instructions. The ASIP includes one or more units for executing a first set of atomic application specific instructions for receiving a first set of data across a plurality of input data ports in a first operation specified in an instruction word. Further, the one or more units execute a second set of atomic application specific instructions for outputting a second set of data across a plurality of output data ports in a second operation specified in the instruction word, wherein an input data port of the plurality of input data ports and a corresponding output data port of the plurality of output data ports share a same address location and are specified as operands in the instruction word. Thus, the first operation and the second operation can occur simultaneously according to the instruction word.

FIG. 1 illustrates an ASIP 100 that uses the VLIW for executing atomic application specific instructions in accordance with an embodiment of the invention.

As illustrated in FIG. 1, ASIP 100 includes one or more units such as, but not limited to, an instruction decoder unit 102, an arithmetic unit 104, an address counter unit 106, an argument unit 108, a program address counter unit 110, a plurality of input data ports for receiving data, a plurality of output data ports for outputting data and a set of registers.

The architectural design of ASIP 100 has the plurality of input data ports and the plurality of output data ports to be on separate bus lines. The plurality of input data ports and the plurality of output data ports share a same address mapping in programming to enable reading or writing on either an input data port or an output data port. This enables latching of data on either the input data port or the output data port and also reduces the number of bits needed for indicating the address mapping of the registers and a plurality of data ports of ASIP 100.

Moving on, instruction decoder unit 102 of ASIP 100 is communicatively coupled to an instruction memory, arithmetic unit 104, address counter unit 106 and program address counter unit 110.

Instruction decoder unit 102 decodes an instruction word fetched from the instruction memory and enables the one or more units included in ASIP 100 for executing a plurality of operations specified in the instruction word.

The plurality of operations specified in the instruction word are decoded by a plurality of sub-modules included in instruction decoder unit 102. The plurality of sub-modules include, but need not be limited to, a general movement decoding module, a specific movement decoding module, an immediate moving decoding module, a complex operations decoding module, an integer operations decoding module, an address counter configuration decoding module, a flow control decoding module and the like.

Further, the instruction word, can be, but need not be limited to, a 32-bit instruction word. Instruction decoder unit 102 decodes the 32-bit instruction word for executing the plurality of operations specified in the instruction word.

The 32-bit instruction word also includes a number of bits for indicating an address location of the set of registers, the plurality of input data ports and the plurality of output data ports. Thus, instruction decoder unit 102 decodes the 32-bit instruction word by receiving the data across the plurality of input data ports of ASIP 100.

In order to receive a set of data across the plurality of input data ports, instruction decoder unit 102 of ASIP 100 decodes and executes a first set of atomic application specific instructions stored in the instruction memory for receiving the set of data across the plurality of input data ports. The first set of data are received across the plurality of input data ports in a first operation specified in the instruction word, wherein the first operation can be, but need not be limited to, a data moving operation for moving data from an input data port to a general register.

Further, instruction decoder unit 102 decodes and executes a second set of atomic application specific instructions for outputting a second set of data across a plurality of output data ports in a second operation specified in the instruction word, wherein the second operation can be, but need not be limited to, a data moving operation for moving the data from a general register to an output data port.

The execution of the first set of atomic application specific instructions for receiving the set of data across the plurality of input data ports as well as outputting the second set of data across a plurality of output data ports can occur simultaneously according to the instruction word.

Moving on, arithmetic unit 104 in communication with instruction decoder unit 102 processes a plurality of operations obtained from instruction decoder unit 102. The plurality of operations include, but need not be limited to, complex operations, integer specific operations, data moving operations and the like that are executed using a plurality of blocks included in arithmetic unit 104. The plurality of blocks can be, but need not be limited to, general purpose registers, input specific registers, output specific registers, an adder and subtractor, a multiplier, a barrel shifter, a reciprocal, a conjugate, a floor, a ceil, an accumulator. Also, arithmetic unit 104 executes a plurality of arithmetic operations between a set of general purpose registers and a set of specific purpose registers.

Further, a latency of operation of arithmetic unit 104 is two clock cycles. A first clock cycle is for loading enables and sub-instructions that are specified by instruction decoder unit 102 from the instruction word. A second clock cycle is for applying the results to the output specific registers.

Moving on, address counter unit 106 in communication with instruction decoder unit 102 stores a plurality of addresses corresponding to the plurality of input data ports and the plurality of output data ports in the instruction memory.

For instance, ASIP 100 includes a plurality of address counters that are controlled by three different types of instructions namely an address counter configuration instruction, an address counter assign instruction, an address counter instruction and the like. The address counter configuration instruction configures one of the plurality of address counters to setup an address counter by using a setup address counter signal and controls the data values of the address counter by using a control data signal. The address counter configuration instruction is also used to setup the address counter and control the data values for starting an address counter of the plurality of address counters.

Similarly, the address counter assign instruction included in a flow of instructions connects each address counter of the plurality of address counters to a specific port of the plurality of input data ports and the plurality of output data ports of ASIP 100 and alters the data values of data-path instructions (dps) by using the address counter instruction.

The latency of configurations and instruction of address counter unit 106 is two clock cycles. A first clock cycle is for loading enables and sub-instructions that are specified by instruction decoder unit 102 from the instruction word. A second clock cycle is for applying instructions or configuration to the address counters.

Further, address counter unit 106 includes three internal values which may include, but need not be limited to, a starting value, a terminating value and a displacement value and initializes the address counter by using a starting value on setting up the setup address counter value to 100.

Address counter unit 106 also includes plurality of internal counters, wherein each counter includes the configuration data and instructions according to the counter number to be proceeded. The configuration data of the plurality of internal counters is controlled by enabling the internal values of the address counter to accept the values according to the setup address counter signal or latch the previous internal values to store the counter configuration. Similarly, the instructions applied to the internal counter either increments the output of address counter unit 106 to '1' or decrements the output of address counter unit 106 by '1' or increments the output or decrements the output by a specific displacement value configured in an address configuration instruction.

Further, argument unit 108 in communication with arithmetic unit 104 and address counter unit 106 allocates the plurality address counters to the plurality of output data ports according to the configuration decoded by instruction decoder unit 102. Argument unit 108 also handles the plurality of operations that transfer the data from the set of general registers to the plurality of output data ports and also the immediate data movement operation specified within the instruction word.

The latency of argument unit 108 is two clock cycles. A first clock cycle is for loading enables and sub-instructions that are specified by instruction decoder unit 102 from the instruction word. A second clock cycle is for outputting the data or address outside the ASIP 100.

For instance, argument unit 108 duplicates the plurality of address counters allocated to the plurality of output data ports six times for six address ports and four times for four output data ports. The values assigned for the six address ports is from '0' to '5' according to the address port number and similarly the values assigned to the four output data ports is from '0' to '3' according to the output data port number.

Moving on, program address counter unit 110 in communication with instruction decoder unit 102 provides an address of a next instruction word to be fetched from the instruction memory. Program address counter unit 110 enables the instruction memory to provide an instruction to be fetched by applying program address counter signal to the instruction memory. Also program address counter unit 110 also controls a loop instruction.

The latency of program address counter unit 110 is two clock cycles. A first clock cycle is for loading enables and sub instructions that are specified by instruction decoder unit 102 from the instruction word. A second clock cycle is for applying the instructions to program address counter unit 110.

Further, program address counter unit 110 includes a plurality of flow control instructions that mainly affects a function of program address counter unit 110. The plurality of flow control instructions may include, but need not be limited to, call instructions, return instructions, wait instructions, jump instructions and conditional jump instructions.

The call instructions load the address of a subroutine into a program address counter signal and calls the subroutine for redirecting a program running in program address counter unit 110 to a specified address location of subroutines. Once, the specified address location of the subroutine is identified, the return address of the subroutine is saved for the corresponding return instruction by moving back the return address to a program address counter register of program address counter unit 110.

Similarly, the wait instructions enable the program address counter register of program address counter unit 110 to retain a current value stored in the program address counter register. Further, the jump instructions load an address derived within the instruction word to the program address counter register of program address counter unit 110.

The conditional jump instructions load address to the program address counter register of program address counter unit 110 according to determined logic register for verifying the value of the logic register. If the value of the logic register is all ones, the data within the instruction word is derived. Otherwise, program address counter unit 110 may be increased by one.

For instance, program address counter unit 110 controls four nested loops. Thus, the loop end instructions load the program address counter register with the corresponding start of loop body address as long as the number of iterations are not exhausted.

In accordance with an exemplary embodiment of the invention, the address mapping sharing between the plurality of input data ports and the plurality of output data ports in ASIP 100 that uses an effective VLIW is illustrated as follows.

A single address mapping is shared between the locations addressed for an input data port and an output data port. For example, a same address location (say "0000" in binary notation) is addressed for input data port0 and also for output data port0 and the location of the operands in the data moving instruction is used to detect if the location address is for the input data port or the output data port.

FIG. 2 illustrates a table that indicates data-path instructions (dps) in the ASIP for a 32-bit instruction word in accordance with an embodiment of the invention.

As illustrated in FIG. 2, the bit locations with the default parameter value of Instruction Code Word (ICW)=32. Bits [31:28] specify the format of the op-code for data-path instruction. Bit 27 indicates whether a general or specific instruction has been currently implemented.

About three moving sub instructions can be effectively moved within the single long instruction. Bit 26 controls the handling of bits [23:16], while bit 25 controls [15:8], and bit 24 controls [7:0]. If mv0 (bit 26) is 1, a move operation is performed from the source src0 addressed by bits [23:20] to the destination dst0 addressed by bits [19:16]. The value of the location addressed for the input data port and output data port are indicated by the "src" and "dest" operands respectively, wherein if the address location is mapped to the "src" operand then ASIP 100 uses the input data port and if the address location is mapped to the "dest" operand then ASIP 100 uses the output data port. So, with the same address location ASIP 100 can accept data from an input port or apply data to an output port.

FIG. 3 illustrates a table that describes address locations allocated for general registers, input data ports and output data ports of ASIP 100 in accordance with an embodiment of the invention.

As illustrated in FIG. 2 and FIG. 3, in a first example, the instruction fe0cd100 (in hex notation) has two moving sub-instructions from src0=0 (Input port 0) to dst0=c (general register g4) and simultaneously from src1=d (general register g5) to dst1=1 (output port 1) because mv0=1 and mv1=1 but mv2=0.

In a second example, the instruction fec01d00 (in hex notation) has two moving sub-instructions from src0=c (general register g4) to dst0=0 (output port 0) and simultaneously from src1=1 (input port 1) to dst1=d (general register g5) because mv0=1 and mv1=1 but mv2=0.

The above mentioned examples explain the difference between using the address location for the input data port or the output data port. In the first example, the address location of the data port 0 is mapped to the source operand allowing the processor to accept the data from the input data bus number 0.

However, in the second example the same address location is mapped to the destination operand allowing the processor to move the data from an internal general register to a different output data bus number 0.

Thus, if there are four input data ports and four output data ports and if an input data port shares a same address mapping with a corresponding output data port, only 4 possibilities are required and therefore only 2 bits are used for mapping the location address, thus, reducing the size of the instruction code word.

Figure 4:
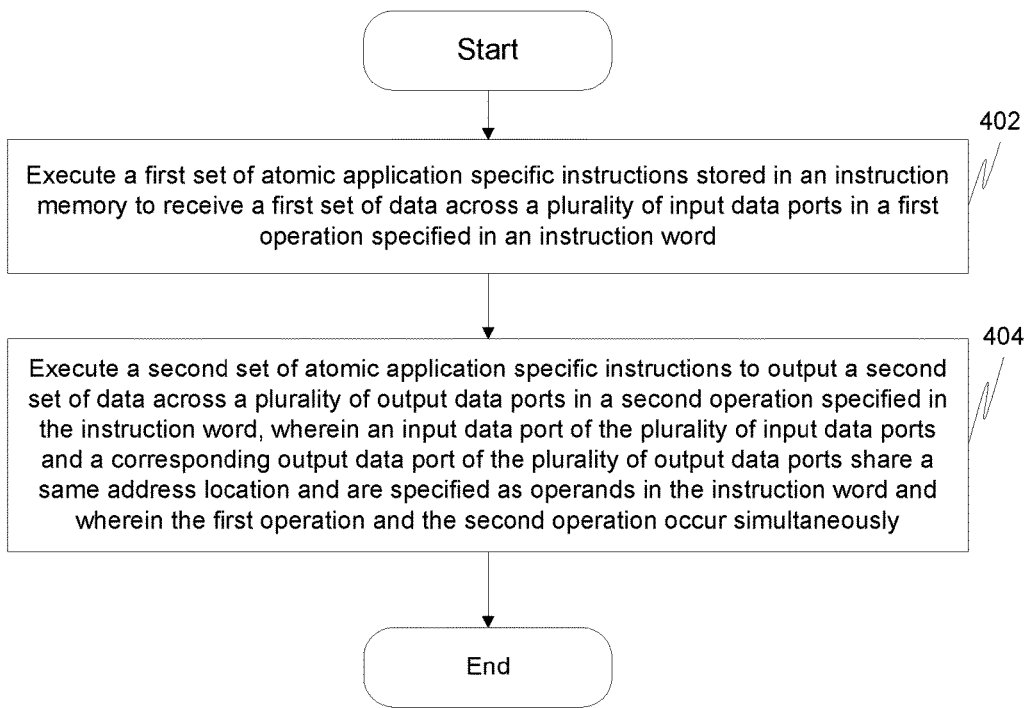
FIG. 4 illustrates a flowchart for executing atomic application specific instructions using the VLIW in the ASIP having input data ports and output data ports that are on separate bus lines and have same address mapping in accordance with an embodiment of the invention.

FIG. 4 illustrates a flowchart for executing atomic application specific instructions using the VLIW in ASIP 100 having input data ports and output data ports that are on separate bus lines and have same address mapping in accordance with an embodiment of the invention.

At step 402, a first set of atomic application specific instructions stored in an instruction memory are executed to receive a first set of data across a plurality of input data ports in a first operation specified in an instruction word.

Further at step 404, a second set of atomic application specific instructions are executed for outputting a second set of data across a plurality of output data ports in a second operation specified in the instruction word, wherein an input data port of the plurality of input data ports and a corresponding output port of the plurality of output ports share a same address location and are specified as operands in the instruction word. Thus, the first operation and the second operation occur simultaneously.

Figure 5:
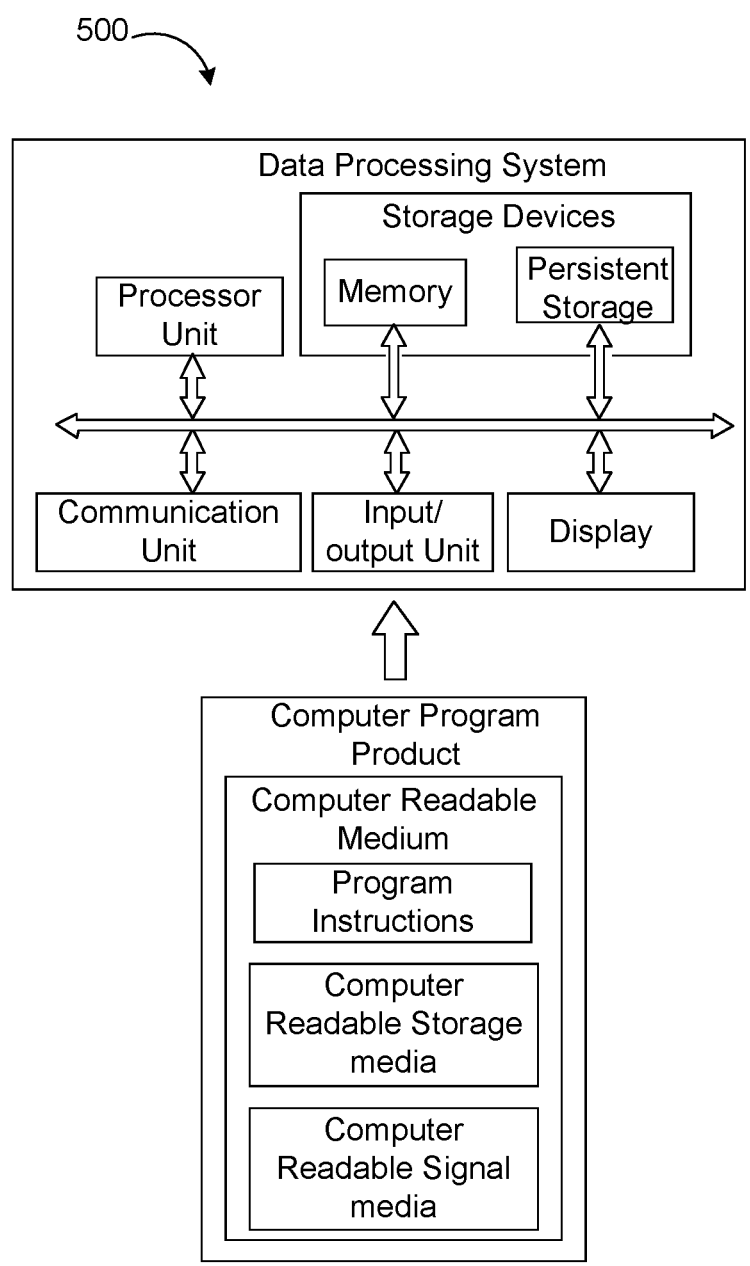
FIG. 5 illustrates a computer program product for executing atomic application specific instructions using the VLIW in the ASIP in accordance with an embodiment of the invention.

FIG. 5 illustrates a computer program product 500 for executing atomic application specific instructions using the VLIW in ASIP 100 in accordance with an embodiment of the invention.

An embodiment of the present invention may relate to computer program product 500 with a non-transitory computer readable medium having program instructions thereon for performing various computer-implemented operations of the method and/or system disclosed herein. The computer readable storage media and program instructions may be those specially designed and constructed for the purposes of the method and/or system disclosed herein, or, they may be of the kind well known and available to those having skill in the computer software arts. Examples of computer-readable storage media include, but are not limited to, magnetic media, optical media, magneto-optical media and hardware devices that are specially configured to store and execute program instructions. Examples of program instructions include machine code, such as produced by a compiler, and files containing higher-level code that are executed by a computer using an interpreter. For example, an embodiment of the present invention may be implemented using JAVA®, C++, or other object-oriented programming language and development tools. Aspects of the present invention may also be implemented using Hypertext Transport Protocol (HTTP), Procedural Scripting Languages and the like.

The present invention provides an optimized design by separating input data ports and output data ports that are assigned with a same address to perform read and write operations. Thus, the present invention affects the width of the instruction word that includes the bits addressing location of the source operand and destination operand.

Further, the present invention increases the performance and throughput of the ASIP by simultaneously executing read operation and write operation for the latched value and also increases the efficiency of the resource usage.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An application specific instruction-set processor (ASIP) that uses a Very Long Instruction Word (VLIW) for executing atomic application specific instructions, comprising:
   one or more units for:
   executing a first set of atomic application specific instructions for receiving a first set of data across a plurality of input data ports in a first operation specified in an instruction word; and
   executing a second set of atomic application specific instructions to output a second set of data across a plurality of output data ports in a second operation specified in the instruction word, wherein an input data port of the plurality of input data ports and a corresponding output data port of the plurality of output data ports share a same address location and are specified as operands in the instruction word, the input data port on a first bus line and the corresponding output data port on a second bus line separate from the first bus line, and wherein the first operation and the second operation can occur simultaneously according to the instruction word.

2. The processor according to claim 1, wherein atomic application specific instructions enable latching a set of data on either an input data port or an output data port.

3. The processor according to claim 1, wherein the first operation is a data moving operation from an input data port to a general register.

4. The processor according to claim 1, wherein the second operation is a data moving operation from a general register to an output data port.

5. The processor according to claim 1, wherein the instruction word is a 32-bit instruction word.

6. The processor according to claim 1, wherein a number of bits of the instruction word used for indicating an address location of a plurality of registers, a plurality of input data ports and a plurality of output data ports is reduced.

7. The processor according to claim 1 further comprises an address counter unit for holding a plurality of addresses corresponding to the plurality of input data ports and the plurality of output data ports.

8. The processor according to claim 1 further comprises an argument unit for assigning a plurality of address counters to the plurality of output data ports according to a configuration decoded by an instruction decoder unit, wherein the argument module handles data transfer from a set of general purpose registers to the plurality of output data ports.

9. A method for executing atomic application specific instructions using a Very Long Instruction Word (VLIW) in an application specific instruction-set processor (ASIP), the method comprising:
   executing, by one or more units, a first set of atomic application specific instructions stored in an instruction memory to receive a first set of data across a plurality of input data ports in a first operation specified in an instruction word; and
   executing, by one or more units, a second set of atomic application specific instructions to output a second set of data across a plurality of output data ports in a second operation specified in the instruction word, wherein an input data port of the plurality of input data ports and a corresponding output data port of the plurality of output data ports share a same address location and are specified as operands in the instruction word, the input data port on a first bus line and the corresponding output data port on a second bus line separate from the first bus line, and wherein the first operation and the second operation can occur simultaneously according to the instruction word.

10. The method according to claim 9, further comprises latching, by one or more units, a set of data on either an input data port or an output data port.

11. A computer program product for executing atomic application specific instructions using a Very Long Instruction Word (VLIW) in an application specific instruction-set processor (ASIP), the computer program product comprising a non-transitory computer readable storage medium having program instructions stored therein, the program instructions readable/executable by one or more units to cause the one or more units to:

execute a first set of atomic application specific instructions for receiving a first set of data across a plurality of input data ports in a first operation specified in an instruction word; and execute a second set of atomic application specific instructions to output a second set of data across a plurality of output data ports in a second operation specified in the instruction word, wherein an input data port of the plurality of input data ports and a corresponding output data port of the plurality of output data ports share a same address location and are specified as operands in the instruction word, the input data port on a first bus line and the corresponding output data port on a second bus line separate from the first bus line, and wherein the first operation and the second operation can occur simultaneously.

12. The computer program product according to claim 11, wherein the program instructions further cause the one or more units to latch a set of data on either an input data port or an output data port.

* * * * *